United States Patent
St. Angel et al.

(10) Patent No.: US 10,163,437 B1
(45) Date of Patent: Dec. 25, 2018

(54) TRAINING MODELS USING VOICE TAGS

(71) Applicant: Amazon Technologies, Inc., Seattle, WA (US)

(72) Inventors: Lindo St. Angel, Los Gatos, CA (US); Nikko Strom, Kirkland, WA (US); Rohan Mutagi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 23 days.

(21) Appl. No.: 15/171,787

(22) Filed: Jun. 2, 2016

(51) Int. Cl.
*G10L 15/18* (2013.01)
*G06F 17/27* (2006.01)
*G06N 99/00* (2010.01)
*G10L 15/20* (2006.01)
G10L 15/06 (2013.01)

(52) U.S. Cl.
CPC .......... *G10L 15/18* (2013.01); *G06F 17/2765* (2013.01); *G06N 99/005* (2013.01); *G10L 15/20* (2013.01); *G05B 2219/2642* (2013.01); *G05B 2219/35453* (2013.01); *G10L 15/06* (2013.01)

(58) Field of Classification Search
None
See application file for complete search history.

(56) References Cited

U.S. PATENT DOCUMENTS

| | | | | |
|---|---|---|---|---|
| 4,520,576 A * | 6/1985 | Vander Molen | ...... | D06F 39/005 219/714 |
| 6,038,535 A * | 3/2000 | Campbell | ...... | G10L 15/08 704/231 |
| 6,253,184 B1 * | 6/2001 | Ruppert | ...... | G03G 15/5016 704/272 |
| 6,418,411 B1 * | 7/2002 | Gong | ...... | G10L 15/20 704/255 |
| 7,302,393 B2 * | 11/2007 | Fischer | ...... | G10L 15/20 704/254 |
| 7,747,687 B2 * | 6/2010 | Kurata | ...... | H04M 1/72563 455/408 |
| 8,150,699 B2 * | 4/2012 | Patch | ...... | 704/275 |
| 2002/0065584 A1 * | 5/2002 | Kellner | ...... | G10L 15/20 701/1 |
| 2004/0122672 A1 * | 6/2004 | Bonastre | ...... | G10L 15/063 704/256.7 |
| 2007/0005206 A1 * | 1/2007 | Zhang | ...... | G06F 3/16 701/36 |

(Continued)

*Primary Examiner* — Richard Z Zhu
(74) *Attorney, Agent, or Firm* — Lee & Hayes, PLLC

(57) ABSTRACT

Techniques for training machine-learning algorithms with the aid of voice tags are described herein. An environment may include sensors configured to generate sensor data and devices configured to perform operations. Sensor data as well as indications of actions performed by devices within the environment may be collected over time and analyzed to identify one or more patterns. Over time, a model that includes an association between this sensor data and device actions may be created and trained such that one or more device actions may be automatically initiated in response to identifying sensor data matching the sensor data of the model. To aid in the training, a user may utter a predefined voice tag each time she performs a particular sequence of actions, with the voice tag indicating to the system that temporally proximate sensor data and device-activity data should be used to train a particular model.

20 Claims, 9 Drawing Sheets

(56) References Cited

U.S. PATENT DOCUMENTS

| | | | |
|---|---|---|---|
| 2007/0198663 A1* | 8/2007 | Helander | H04L 41/0806 709/220 |
| 2010/0023320 A1* | 1/2010 | Di Cristo | G06F 17/273 704/9 |
| 2013/0226580 A1* | 8/2013 | Witt-Ehsani | G06F 3/167 704/244 |
| 2015/0162006 A1* | 6/2015 | Kummer | H04L 12/2803 704/275 |
| 2015/0324706 A1* | 11/2015 | Warren | H04L 12/2803 700/275 |
| 2016/0173359 A1* | 6/2016 | Brenner | G06F 19/00 600/301 |

* cited by examiner

TRAINING MODELS USING VOICE TAGS

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech input and gestures.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
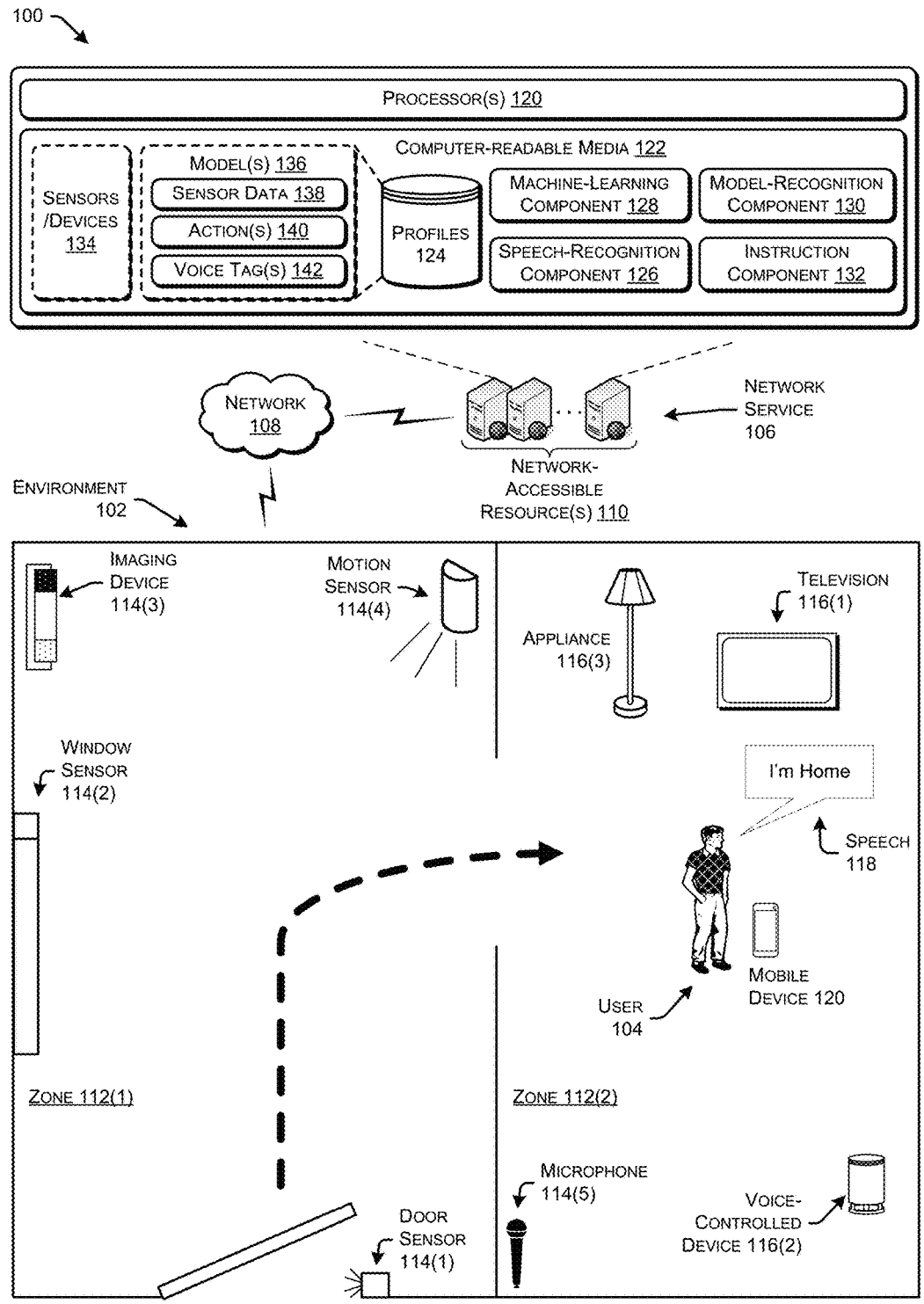
FIG. 1 is a schematic diagram of an illustrative architecture that includes a user environment, which includes different sensors and devices. The sensors collect data, which a network service uses to identify patterns of user behavior within the user environment and create corresponding models. For instance, when the user arrives home from work each day, he may power on his television within the environment. Therefore, as the network service learns this pattern, it may at some point automatically power on the television when the sensor data indicates that the user has arrived home. In some instances, the user may state a predefined utterance (e.g., "I'm home") each time he arrives home to aid in the training of the model.
Figure 2:
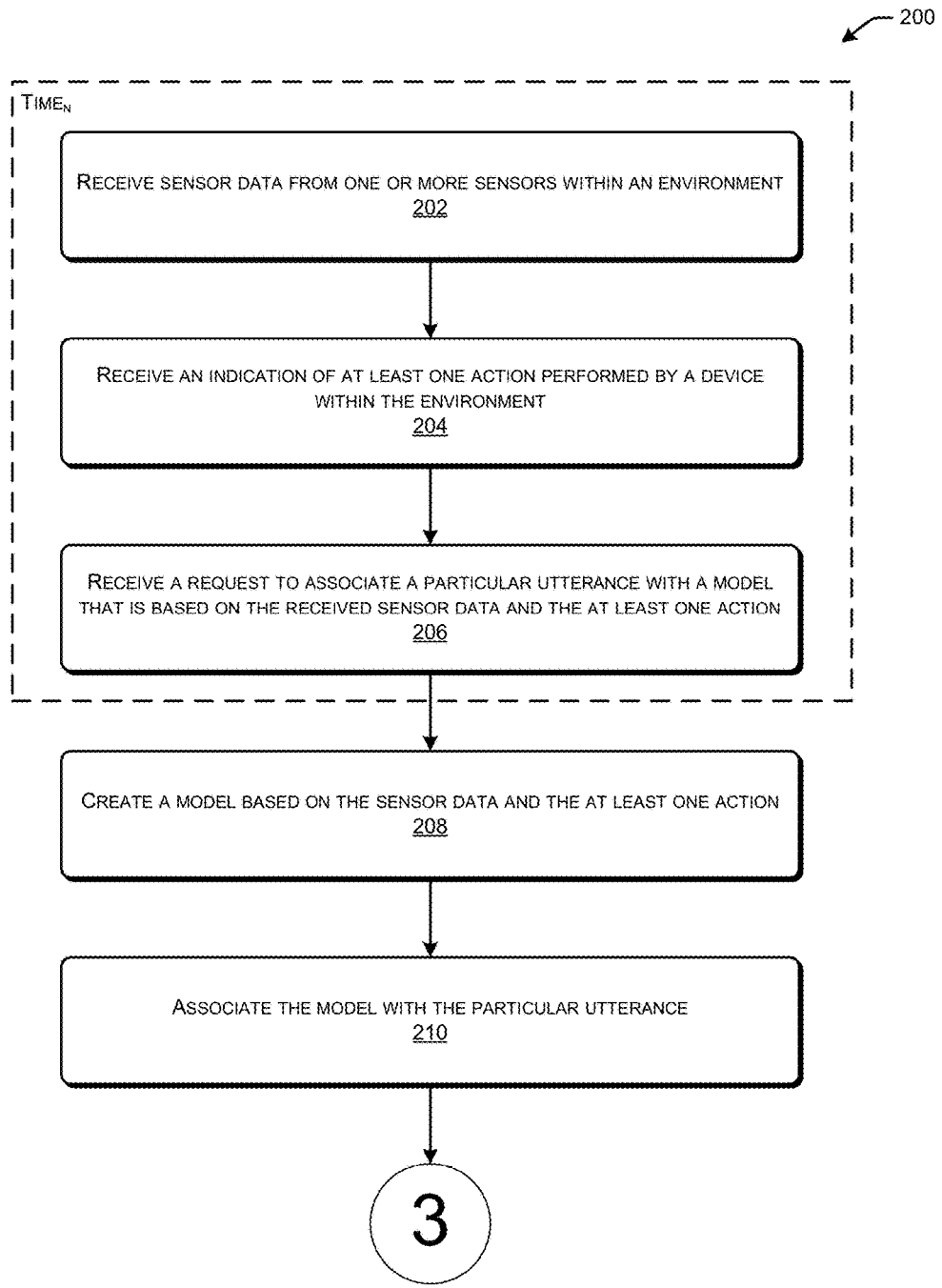
FIGS. 2-5 collectively illustrate a flow diagram of an example process for training a model using sensor data from sensors within an environment, actions performed by devices within the environment, and an utterance or voice tag uttered by a user.

Techniques for training machine-learning algorithms with the aid of voice tags are described herein. For instance, an environment may include an array of sensors configured to generate an array of sensor data and an array of devices configured to perform an array of operations. In some instances, sensor data and indications of actions performed by devices within the environment may be collected over time and analyzed to identify one or more patterns. For instance, a correlation may be found between a particular, consistent stream of sensor data and one or more operations performed by devices within the environment. Over time, a model (or "classifier") that includes an association between this sensor data and device actions may be created and trained such that one or more device actions may be automatically initiated in response to identifying sensor data matching the sensor data of the model.

In some instances, each time a user performs actions corresponding to a particular model, the user may utter a particular utterance that is associated with the model. A device within the environment may generate an audio signal representing this speech and speech-recognition may be performed on the audio signal to identify the utterance. Upon identifying the utterance, the model associated with the utterance may be identified and the current sensor data as well as any actions performed by devices within the environment may be used to train the model.

The sensors described herein may comprise any sort of sensor capable of identifying any type of activity or information within the environment. For instance, the sensors may include cameras, microphones, motion sensors, weight sensors, door sensors, window sensors, ambient light sensors, infrared sensors, other types of optical sensors, or the like. The devices within the environment, meanwhile, may comprise display devices (e.g., televisions, projectors, etc.), audio devices (e.g., speakers, televisions, etc.), mobile devices (e.g., mobile phones, tablets, readers, etc.), secondary appliances (e.g., lamps, thermostats, refrigerators, automatic doors, automatic blinds, coffee makers, alarm clocks, dishwashers, washing machines, garage door openers, etc.), and/or the like. It is to appreciated that in some instances a particular apparatus may function as both a sensor and a device. For instance, a television may function as both a sensor (e.g., by including a camera for generating video of an environment and/or a microphone for generating audio signals based on sound captured within the environment), as well as a device (e.g., by including a video display and, potentially, speakers for outputting audio content). In another example, a voice-controlled device may include a microphone for generating audio signals based on sound captured within the environment as well as a speaker for outputting audio content (e.g., audio books, music, etc.) to the user within the environment.

In some instances, each sensor and device within an environment communicatively couples to one or more computing devices of a network service configured to create and train models that identify associations between sensor data and device actions with the consent of, and at the request of, users associated with the environment. These sensors and devices may be capable of coupling to a network (e.g., a LAN, WAN, etc.) and/or may be capable of communicating with other devices via short-range wireless radio communication (e.g., Bluetooth®, Zigbee®, etc.). For instance, the door sensors, motion sensors, cameras, and the like may continuously, periodically, or at any other time send its respective sensor data to the one or more computing devices of the network service. Similarly, when the devices within the environment perform one or more actions, the devices may send indications of these respective actions to the one or more computing devices. For instance, when a door sensor identifies that the door it monitors has been opened, the door sensor may send an indication of the door opening to the one or more computing devices, potentially along with an indication of time a when the door was opened. Similarly, when a motion sensor detects motion within the environment, the motion sensor may send such an indication to the one or more computing devices. Further, when a user powers on a television, the television may send an indication of this event to the one or more computing devices. Further, the television may send an indication of the content played on the television (e.g., the particular channel to which the user tunes the television, the particular show or content service used, or the like), the volume level at which the content is output, or the like. In each instance, the sensors and devices may send respective device identifiers (DIDs) and respective indications of times associated with each event.

In response to receiving this sensor data and indications of device activity over time, the one or more computing device may utilize machine-learning techniques to identify one or more common patterns. That is, the one or more computing devices may determine that a particular stream of sensor data at a particular time is often followed closely in time with one or more particular device activities. For instance, the one or more computing devices may determine that a microphone often generates an audio signal around 6:00 am that includes sound corresponding to an alarm clock, followed by a motion sensor in the hall detecting motion, followed by the lights in the kitchen being powered on, followed by the coffee maker being powered on and the television being turned on to display the morning news. Using machine-learning algorithms over time, the one or more computing devices of the network service may generate a model indicating that the a certain set of sensor data (e.g., the audio signal indicating the alarm clock and the motion sensor in the hallway) corresponds to (e.g., is temporally proximate to) certain device activities (e.g., the lights, coffee maker, and television being powered on). After generating the model, in response to the one or more computing devices identifying this particular set of sensor data, the computing devices may issues one or more instructions to the lights, the coffee maker, and the television to power on at the times the user typically does so (or potentially just before).

In some instances, the user may associate utterances (or "voice tags") with these models to aid in the training of these models. For instance, in the above example, the user may request to associate the voice tag "I'm awake" with the example model discussed above. That is, when the user awakes, the user may utter "I'm awake". A sensor within the environment may generate an audio signal representative of this voice tag and may provide this audio signal to the one or more computing devices. The audio signal representing the alarm-clock sound as well as the motion data representing the motion data detected by the motion sensor may also be sent to the one or more computing devices proximate in time to the user uttering the voice tag. Again, the user may typically proceed to turn on the kitchen lights, the coffee maker, and the television. Thereafter, when the user awakes in the morning, the user may issue the voice tag ("I'm awake"), which, when identified by the computing devices, may result in the computing devices using subsequently received sensor data and device-activity data for training the model associated with this particular voice tag. That is, the user may accelerate the training of the afore-mentioned model by associating a particular voice tag with sensor data and related device activity and later utilizing this voice tag to indicate that the data should be used to train the model. By doing so, the system may be configured to relatively quickly perform the device activities (e.g., turning on the lights, coffee maker, and television) in response to identifying the sensor data of the model (the audio signal and the detected motion), without the need for a voice command or any other type of explicit command.

In another example, envision that the user often returns home from work on weekdays at a relatively consistent time (e.g., approximately 5:30 pm), entering through the front door, walking down his hallway, and turning on his living-room television. In response to these events, a door sensor on the front door may send an indication that the door has been opened, the hall motion sensor may send an indication of detected motion, and the television may send an indication that it has been powered on. Further, envision that the user requests to associate the voice tag "I'm home" with this set of activity. Thereafter, when the user returns home from work, he may consistent issue the voice tag, while the afore-mentioned sensors may continue to send their sensor data to the one or more computing devices, while the television may continue to send an indication that it has been powered on. In response to receiving the audio signal including the voice tag, and identifying the voice tag via speech-recognition, the computing devices may use the received sensor data and device-activity data to train a model that has been created to associate this sensor data to the device-activity data. As the user continues, day after day, to return home from work and issue the voice tag, the sensor data and device-activity data temporally proximate to this voice tag may be used to identify and train the model. After the computing devices determine that the model has been adequately trained, the computing devices may send an indication to the user indicating that the model has been trained. Thereafter, when the user returns home from work, entering the front door and walking down the hall towards the living room, the one or more computing devices may send an instruction to the living-room television to power on based on receiving sensor data, from the door sensor and the motion sensor, indicating that the user is home. Further, while use of a particular voice tag (e.g., "I'm home") may accelerate the training of a model in some instances, in other instances these models may be trained without voice training. For instance, in the example above, the sensor data associated with the sequence of the door sensor detecting that the door has been opened (e.g, near 5 pm on weekdays) followed closely in time to the hall motion sensor detecting motion may be enough to associate the sensor data with the model without the use of a voice tag. In these instances, the model may be identified and trained in response to the detection of that particular sequence of sensor data. For example, if a particular sequence of sensor data is often followed by a particular device action (e.g., powering on the living-room television), then the model may be created and trained and the device action may be performed in response to identifying the particular sequence of sensor data.

In some instances, the one or more computing devices of the network service may accelerate the training of a model by explicitly requesting that a user repeat a sequence of actions associated with the model. For instance, continuing the example above where the user enters the front door, walks down the hall, and turns on the television, while at some point uttering the voice tag "I'm home", the network service or an application executing on a device of the user may request that the user repeat these sequence of actions. For instance, in response to the user requesting to associate the voice tag "I'm home" with this sequence of actions, the network service or the application may prompt the user to repeat this sequence of actions a certain number of times to allow the system to train the model.

In some instances, depending on the level of confidence that a particular stream of sensor data corresponds to a particular model, the network service may issue a request to confirm that the user would like to cause devices to perform actions that are associated with the model. For instance, after the one or more computing devices of the network service have trained a model associated with the user arriving home from work and powering on the television to the evening news, envision that the door sensor sends an indication, proximate to 5:30 pm, that the door has been opened and that the hall motion sensor sends an indication, also proximate to 5:30 pm, that it has detected motion. The one or more computing devices may determine with a certain level of confidence that this sensor data corresponds to the model (associated with the voice tag "I'm home"). However, prior to sending an instruction to the television to power on to display the evening news, the one or more computing devices may send a confirmation request to the user. For instance, the one or more computing devices of the network service may send an instruction to output, audibly and/or visually on a device within the environment of the user, a query such as "It appears that you have arrived home, would you like to turn on the evening news on the television in the living room." If the user responds affirmatively, the network service may send an instruction to the television to power on. Further, the response of the user may be used to train the model. In some instances, this interaction between the network service and the user occurs via a voice-controlled device within the user environment. In other instances, the network service communicates with the user via a graphical user interface (GUI) presented on a mobile phone, tablet, or other device associated with the user.

In addition to performing the activities determined to be associated with the model, in some instances the one or more computing devices of the network service may suggest one or more additional or alternative activities to perform. For instance, the network service may suggest turning on or off certain devices within the environment, consuming certain content on the devices, or the like. In some instances, the network service may identify these additional or alternative activities with reference to models associated with other users. For instance, the network service may determine that users that often turn on the evening news upon arriving home from work often also open the automatic blinds of turn up the thermostat. As such, upon the network service determining, based on received sensor data, that the user has arrived home, the network service may output a suggestion to a device within the environment of the user, such as "People who often turn on the news upon arriving home from work often also open the blinds and turn up the thermostat, would you like me to perform either of these activities?" If the user responds affirmatively, the one or more computing devices of the network service may send corresponding instructions to the devices within the environment. Further, the model may be further trained based on the user's response.

In some instances, models may be associated with profiles of a particular environment, while in other models may be associated with particular users. In the former instances, for example, the network service may instruct devices to perform actions associated with a particular model in response to identifying a set of sensor data corresponding to the model without reference to a particular user associated with the sensor data. For instance, regardless of which user opens the door within the example environment and walks down the hall at or near 5:30 pm on a weekday will result in the network service instructing the television to power on and display the evening news. In the latter instances, meanwhile, the models may be user-specific, such that each model is associated with one or more users. In these instances, the network service will instruct the television to power on in response to identifying that a particular user associated with that example model is associated with the received sensor data.

The techniques described herein may utilize one or more of an array of techniques for identifying users. In one instance, during the training of a particular model, an RF sensor or the like may receive a signal from a mobile device associated with a particular user, such as a mobile phone of the user. The network service may identify the user with reference to the signal from the mobile device and may associate the model with the user and/or the mobile device. Thereafter, when the network service receives a set of sensor data corresponding to the model, the network service may determine whether the signal of the mobile device is present. If so, the network service may instruct the television to perform the operation associated with the model. If not, the network service may refrain from doing so.

In other instances, when a model is being created and/or trained, the network service may utilize facial-recognition, voice-recognition techniques, and/or pattern-recognition techniques to determine the identity of the user associated with the model. That is, a camera may send, to the one or more computing devices of the network service, one or more images of the user associated with a particular model. Additionally or alternatively, the network signal may determine a voiceprint of a user that provides the voice tags (e.g., "I'm home"). In still another example, the identity of the user may be determined based on the sequence of actions identified by the sensors and/or based upon the speed of the user as measured from a time associated with the sequence of actions identified by the sensors.

Based on this information, the one or more computing devices may identify the user and may associate the model with features from the images, the voiceprint, or the pattern/ speed of the user. In each instance, the network service may later trigger the device operations in response to receiving sensor data that corresponds to that particular user. That is, if a user enters the example user environment at 5:30 and walks down the hall, the network service may use facial-recognition, voice-recognition, or other techniques to determine whether the user is the user that is associated with the model. If so, the network service may send an instruction to the television to turn on the evening news.

In addition, in some instances a user may explicitly associate additional device actions with a particular model. Continuing the above example where a user often arrives home from work around 5:30 pm and proceeds to turn on the evening news, envision that the user also wishes to add the action of opening the automatic blinds to the model. The user may issue a command to the network service to perform this additional action and to associate this action with the model that is associated with the voice tag "I'm home". To do so, the user may issue a voice command (e.g., "add the action of opening living-room blinds to the model associated with the voice tag I'm home") or may utilize a GUI on an application executing on a device of the user.

Various machine learning techniques may be used to perform the training of models (sometimes labeled classifiers). Models may be trained and operated according to various machine learning techniques. Such techniques may include, for example, inference engines, trained classifiers, etc. Examples of trained classifiers include conditional random fields (CRF) classifiers, Bayesian classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the described models, requires establishing a "ground truth" for the training examples. In machine learning, the term "ground truth" refers to the accuracy of a training set's classification for supervised learning techniques. For example, known types of previous device actions and/or sensor data may be used as ground truth data for the training set used to train a model, such as the model associated with the user arriving home. As such, when the user is determined to have uttered the voice tag "I'm home", the systems described herein may use this determination to use sensor data and device actions that are proximate in time to the identified voice tag as training data for establishing the "ground truth" of the model.

Various techniques may be used to train the models including backpropagation, statistical learning, supervised learning, semi-supervised learning, stochastic learning, stochastic gradient descent, or other known techniques. Further, while the training examples discussed above and below use sensor data and actions performed by devices, other training data (e.g., time of day, day of week, user identification, etc.) may also be used. Thus, many different training examples may be used to train the machine learning models (classifiers) discussed herein. Further, as training data is added to, or otherwise changed, new models may be trained to update the models as desired. For instance, if the user changes his routine upon arriving home, the model may be re-trained to represent these changes.

After the model is trained, using the techniques described above and in further detail below, sensor data collected and analyzed at runtime may trigger certain actions associated with the model. For instance, after the model described above has been trained, the systems described herein may identify, from sensor data received from the door sensor and the motion sensor, that this data correlates closely with the model. As such, the systems may cause, in real-time or substantially real-time, the corresponding actions to occur, such as turning on the user's television and tuning it to the appropriate channel (or otherwise causing the television to display the appropriate content).

FIG. 1 is a schematic diagram of an illustrative architecture 100 that includes an environment 102 associated with a user 104, with the environment 102 including different sensors and devices. The sensors collect data and provide this sensor data a network service 106 over a network 108. The network 108 may represent an array or wired networks, wireless networks (e.g., WiFi), or combinations thereof. The network service 106, which comprises one or more network resources or devices 110, uses the sensor data to identify patterns of user behavior within the user environment 102 and create corresponding models. For instance, when the user 104 arrives home from work each day, he may power on his television within the environment. Therefore, as the network service 106 learns this pattern, it may at some point automatically power on the television when the sensor data indicates that the user 104 has arrived home. In some instances, the user may state a predefined utterance (e.g., "I'm home") each time he arrives home to aid on the training of the model.

For illustrative purposes only, the environment 102 comprises a first zone 112(1) (e.g., corresponding to a first room of the home, building, or the like) and a second zone 112(2). FIG. 1 illustrates an example where the user 104 enters through a front door of the environment 102 into the first zone 112(1) and then into the second zone 112(2).

As illustrated, the environment 102 may include an array of sensors, including a door sensor 114(1) that detects the opening or closing of the door, a window sensor 114(2) that detects the opening or closing of a corresponding window, an imaging device 114(3) that may capture one or more images (e.g., video), a motion sensor 114(4) configured to detect motion, a microphone 114(5) configured to generate audio signals based on sound detected within the environment, and/or additional or alternative sensors. These sensors may be configured to capture respective sensor data and provide (e.g., upload) this data to the network service 106 with the consent of the user 104. In some instances, each sensor couples to the network 108 and provides the sensor data over the network 108. In other instances, a first sensor couples to a second sensor over a short-range wireless communication connection (e.g., Bluetooth) to provide its sensor data to the second sensor, which in turn provides this sensor data to the network service 106 over the network 108.

The environment 102 may further include one or more devices configured to perform an array of operations within the environment 102. For instance, the example environment 102 includes a television 116(1), a voice-controlled device 116(2), and a smart appliance 116(3) (in this case a lamp). When a device performs an action, such as power on, power off, output certain content, or the like, the device may provide an indication of this action to the network service 106. As with the sensors, the devices may communicate directly with the network service 106 over the network or may instead communicate with another device or sensor, which may in turn communicate with the network service.

The network service 106, meanwhile, may function to analyze the received sensor data and the received indication of actions performed by the devices to identify common patterns of behavior of the user 104 within the environment 102. In the illustrated example, the user 104 enters the front door of the environment 102, walks through the zone 112(1) and into the zone 112(2) and turns on the television 106(1). As such, the door sensor 114(1) may send, to the network service 106, an indication that the door has been opened at a first time, while the motion sensor 114(4) may send an indication that motion has been detected proximate to the first time. In addition, the television 116(1) may send an indication that it has been powered on, potentially referencing the content or channel it is outputting.

In addition, the user 104 may tag this activity with a particular voice tag. That is, each time the user arrives home, he may utter predefined speech 118 that is associated with the sequence of events of arriving at the environment 102. In this example, the user has associated the voice tag "I'm home" with the events that occur when the user arrives at the environment 102. The use of this voice tag may accelerate the training of a model associated with the events of arriving home, the model associating certain sensor data with actions subsequently performed by devices within the environment 102.

The network service 106 may reside at one or more different locations. In some instances, some or all of the resources 110 of the network service 106 may reside at or near the environment 102. In other instances, some or all of the resources 110 of the network service 106 may reside remotely from the environment 102. For instance, some or all of the network service 106 may generally refer to a network-accessible platform—or "cloud-based service"—implemented as a computing infrastructure of processors, storage, software, data access, and so forth that is maintained and accessible via the network 114, such as the Internet. Cloud-based services may not require end-user knowledge of the physical location and configuration of the system that delivers the services. Common expressions associated with cloud-based services, such as the network service 106, include "on-demand computing", "software as a service (SaaS)", "platform computing", "network accessible platform", and so forth.

As illustrated, the network-accessible resources 110 of the network service 106 comprise one or more processors 120 and computer-readable storage media 122 executable on the processors 120. The computer-readable media 122 may store a profile datastore 124 storing information associated with one or more profiles, a speech-recognition component 126, a machine-learning component 128, a model-recognition component 130, and an instruction component 132. The profile datastore 124 may store an array of information regarding different user profiles, environment profiles, or the like. For instance, a profile associated with the user 104 and/or the environment 104 may store an indication 134 of the different sensors and/or devices within the environment 102, as well an indication 136 of any models that have been associated with the user 104 and/or environment 102. Each model may correlate certain sensor data 138 with certain actions 140. That is, a particular model represents a sequence of events that often occur within the environment, with these events including events that are represented by certain sets of sensor data and events that are represented by certain device activities. For instance, one particular model may indicate the correlation between the door sensor 114(1) indicating that a door has been opened around 5:30 pm on a weekday followed by motion being detected by the motion sensor 114(4). This sensor data 138 may be related via the model to the actions 140, indicating that the television 116(1) within the environment 102 is powered on (potentially to a particular channel). Therefore, when a model is created, the actions 140 may be performed automatically within the environment 102 in response to the network service 106 identifying the corresponding sensor data 138 of the model 136.

In some instances, a particular model 136 may be associated with a particular voice tag 142. For instance, in the example above, the voice tag 142 "I'm home" may be associated with the sensor data of the door sensor 114(1) and the motion sensor 114(4) and the action of the television 116(1) powering on. In some instances, the user 104 may associate this voice tag 142 using a voice command, while in other instances the user 104 may utilize a GUI of an application executing on a device, such as a mobile device 120 associated with the user. In the former instances, the user 104 may issue a voice command to the voice-controlled device 116(2) (or another voice-enabled device) to associate a previously seen set of sensor data and device actions with the utterance "I'm home." For instance, a user may walk through the front door and down the hall at a certain time, and may proceed to turn on the television 116(1) before issuing a voice command to associate the voice tag "I'm home" with that model. In response, the network service 106 may create the model 136 associated with the sensor data 138, the actions 140, and the voice tag 142. In some instances, the network service 106 may request that the user 104 repeat the sequence of actions a certain number of times such that the network service 106 is able to train the model 136. In other instances, the user 104 may utilize the application on the mobile device 120 (or any other device) to associate the utterance "I'm home" with the model 136.

Regardless of how the user 104 associates the voice tag 142 with the model 136, when the user arrives home and completes the sequence of actions resulting in the sensor data 138 and the device actions 140, the user may utter the phrase "I'm home" to indicate to the network service 106 that the data and actions seen by the network service 106 correspond to the model 136. As such, this information may be used to further train the model 136, as discussed below.

As discussed above, the computer-readable media 122 may store the speech-recognition component 126, the machine-learning component 128, the model-recognition component 130, and the instruction component 132. The speech-recognition component 126 may function receive audio signals generated based on sound detected within the environment and may perform automatic speech recognition (ASR) on the audio signal to generate text corresponding to speech of a user. The component 132 may then analyze this text to identify any voice commands therein. In some instances, a device within the environment, such as the voice-controlled device 116(2), also includes a speech-recognition component that identifies a predefined wake word and, upon identifying the user 104 speaking the predefined wake word, the device 116(2) may begin uploading an audio signal representing sound captured in the environment 102 up to the network service 106. For instance, in the illustrated example, the voice-controlled device may detect the user uttering the predefined wake word before sending, over the network 108 and to the network service 106, an audio signal representative of the speech 118 of the user 104 to the network service 106.

The machine-learning component 128, meanwhile, may receive an indication that the speech 118 includes the voice tag 142 "I'm home". In response, the component 128 may identify the model 136 associated with this voice tag 142 and may use sensor data recently received from the environment and indications of activities recently (or shortly thereafter) performed by devices within the environment to train the model 136. That is, in response to identifying the voice tag 142 corresponding to the model 136, the machine-learning component 128 may train the model 136 using any known machine-learning techniques. That is, in response to identifying the voice tag 142, the machine-learning component 128 may input the sensor data and device activities into one or more machine-learning algorithms to further train the model. For instance, the model 136 may comprise an artificial neural network, a Bayesian classifier, a linear classifier, or any other type of known machine-learning algorithm that is able to identify patterns and classify data as corresponding to the model (or not). By training the model 136 using this data, the model 136 becomes more accurate at later determining whether received sensor data corresponds to the model 136 and, thus, whether to perform any actions 140 associated with the model 136.

After the model 136 has been created and trained, the model-recognition component 130 may function to determine when to implement the actions 140 associated with the model based on received sensor data having a threshold similarity to the sensor data 138 of the model. That is, as sensor data is constantly, periodically or irregularly sent up to the network service 106, the model-recognition component 130 may attempt to identify sets of sensor data that correspond to a previously created model associated with the environment 102 and/or the user 104. For instance, upon identifying sensor data indicating that the door sensor 114(1)

has indicated that front door has been opened proximate to 5:30 pm on a weekday and the motion sensor 114(4) has detected motion, the model-recognition component 130 may determine that this sensor data corresponds to the model 136 (i.e., belongs to a class specified by the model) and, therefore, determines that the activities 140 associated with this model 138 are to be performed. That is, the model-recognition component 130 and the model 136 may comprise a classifier that determines whether or not a particular data set belongs to the class specified by the model 136.

In instances where received sensor data is determined to correspond to the model (e.g., with a predefined threshold amount of confidence), then the instruction component 132 may function to cause performance of the activities 140 associated with the model 136. In this example, the activity associated with the model 136 comprises the television 116(1) in the zone 112(2) of the environment 102 being powered on and tuned to the evening news. As such, the instruction component 132 may send an instruction to the television 116(1) over the network, instructing the television 116(1) to power on and display the evening news.

FIGS. 2-5 collectively illustrate a flow diagram of an example process 200 for training a model using sensor data from sensors within an environment, actions performed by devices within the environment, and an utterance or voice tag uttered by a user. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some instances, the network service 106 described above performs some or all of the operations of the described processes, although other entities may perform some or all of these actions in other implementations.

At 202, the network service 106 receives, at or proximate to a particular time $T_N$, sensor data from one or more sensors within an environment. As discussed above, this sensor data may indicate a door having been opened or closed in the environment, a window having been opened or closed in the environment, a door having been locked or unlocked in the environment, a window having been locked or unlocked in an environment, motion having been detected within the environment, speech having been detected within the environment, blinds having been opened or closed within the environment, a light having been turned on or off in the environment, or any other type of sensor data.

At 204, the network service 106 receives, proximate to the time $T_N$, an indication of at least one action performed by a device within the environment. That is, the network service 106 receives an indication that a particular device (or devices) within the environment has performed a particular operation proximate in time to the sensor data detected by the sensors. The action performed by the device may comprise at least one of the device powering on, the device powering off, the device outputting certain content, the device setting an alarm, the device opening, the device closing, or the device adjusting a volume of the device. Of course, while a few examples have been listed, it is to be appreciated that the device(s) within the environment may perform any other action. Further, it is to be appreciated that a model may be associated with a sequence of sensor data without a corresponding device action. For instance, each time a user arrives home, he may state the voice tag "I'm home", thus associating the received sensor data with the model associated with that tag. Sometime after creating and/or training the model, the user may then choose to associate a particular device action with the model. For example, the user may request (via a voice command, a GUI command, etc.) to turn on the kitchen lights when the system detects sensor data corresponding to the model associated with the voice tag "I'm home".

At 206, the network service 106 receives, proximate to the time $T_N$, a request to associate a particular utterance with a model that correlates the sensor data received at 202 with the indication of the device action received at 204. As discussed above, a user may issue this request via voice, via a GUI, or in any other manner. At 208, the network service 108 may create a model that correlates this sensor data with the device action and, at 210, associates the utterance (or voice tag) with this model. For instance, the network service 106 may create a model that associates the door sensor detecting the front door being opened in the evening on a weekday and the motion detected by the motion sensor with the television being powered on with the evening news. In addition, the network service 106 may associate the voice tag "I'm home" with this data.

Figure 3:
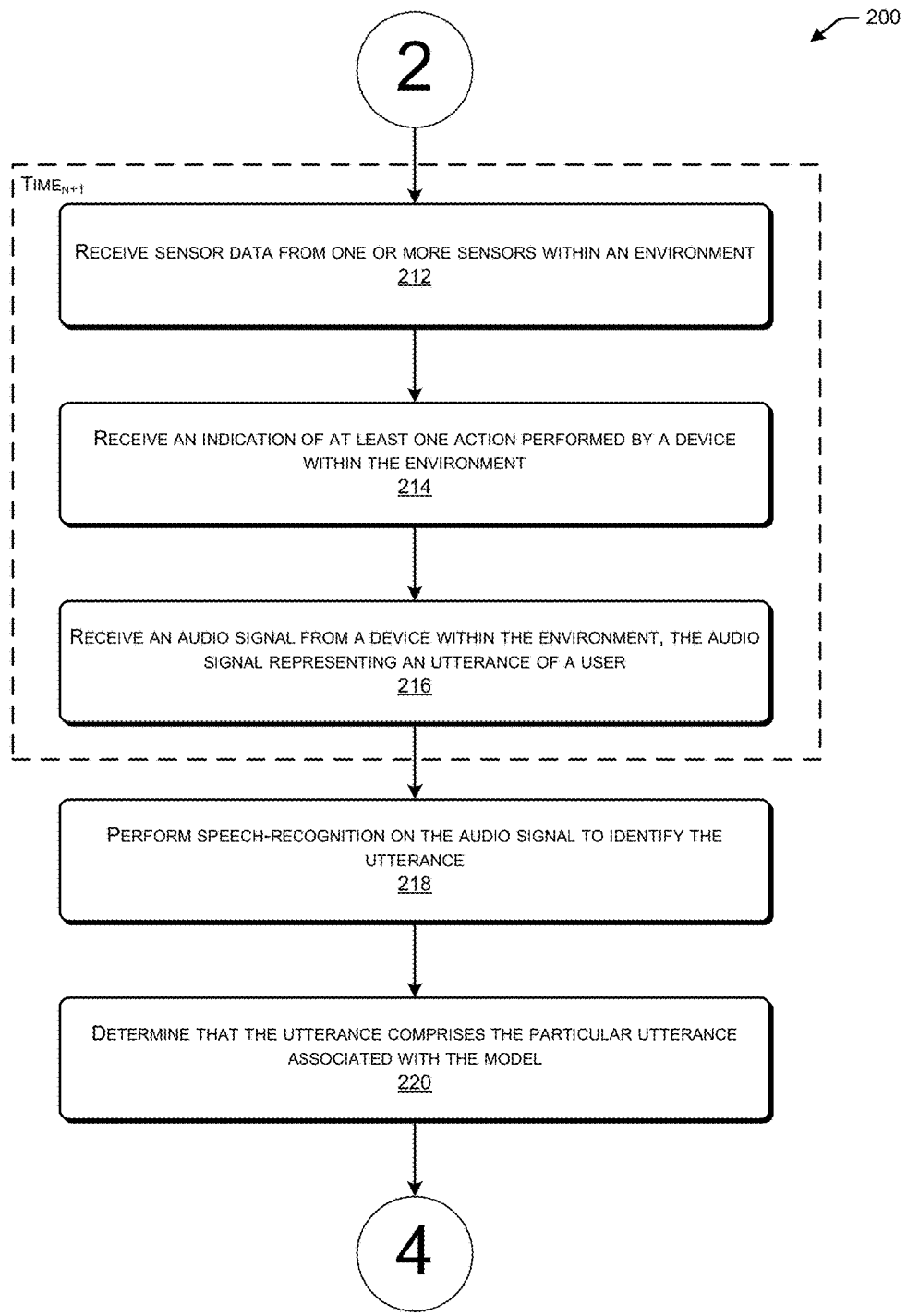

FIG. 3 continues the illustration of the process 200. At 212, the network service 106 receives, at a later time $T_{N+1}$, sensor data from one or more sensors within the environment. In addition, at 214, the network service 106 receives, proximate the time $T_{N+1}$, an indication of at least one action performed by a device within the environment. At 216, the network service 106 receives, also proximate the time $T_{N+1}$, an audio signal from a device within the environment, the audio signal representing an utterance of a user within the environment. At 218, the network service 106 performs speech-recognition on the audio signal to identify the utterance and, at 220, determines that utterance comprises the particular utterance associated with the model. For instance, the network service 106 determines that the utterance comprises the phrase "I'm home", which is associated with the model created at 208.

Figure 4:
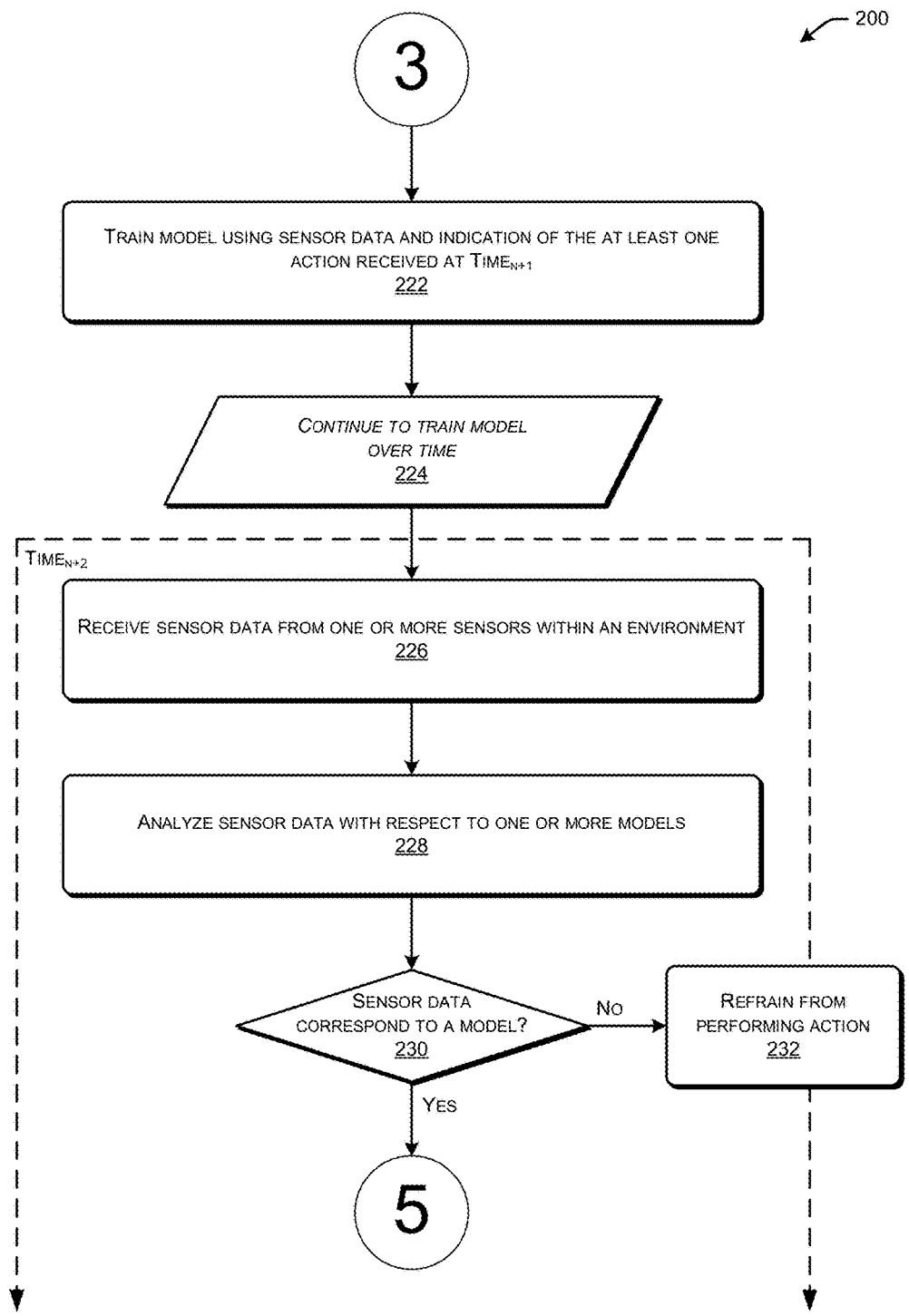

FIG. 4 continues the illustration of the process 200. At 222, the network service 106 trains the model using the sensor data and the indication of the device activity received at or proximate to the time $T_{N+1}$. For instance, based on identifying the user's voice prompt that the data is associated with the model, the service 106 inputs the received data into one or more machine-learning (e.g., supervised-learning) algorithms to train the artificial neural network, Bayesian classifier, or other machine-learning algorithm. In some instances, the machine-learning algorithms include a supervised learning algorithm configured to generate a function for determining whether or not input sensor data corresponds to the class specified by the model.

An operation 224 represents that the network service 106 may continue to train this model over time. That is, in response to the network service 106 identifying the particular utterance associated with the model, the network service may use the sensor data and the indication of device activities received proximate to this utterance to train this model, as instructed by the user.

At 226, and at a time $T_{N+2}$ after the model has been trained, the network service 106 again receives sensor data from one or more sensors within the environment. At 228, the network service analyzes this sensor data with respect to sensor data associated with one or more models. At 230, the network service 106 determines whether the received sensor data corresponds to a class specified by a particular model. If not, then at 232 the network service 106 refrains from performing an action associated with a model. In some instances, comparing received sensor data to sensor data associated with a model may include comparing both the contents of the received sensor data to the contents of the model sensor data, as well as comparing a sequence associated with the received censor sensor data to the sequence associated with the model sensor data. Further, this comparing may include comparing a total amount of time associated with the sequence of the received censor sensor data to total amount of time associated with the sequence of the model sensor data. For instance, a user who moves through an environment very quickly may be disambiguated from a user who moves through the environment slowly, given that the time associated with sensor data associated with the faster user will be substantially less than the time associated with the sensor data associated with the slower user.

Figure 5:
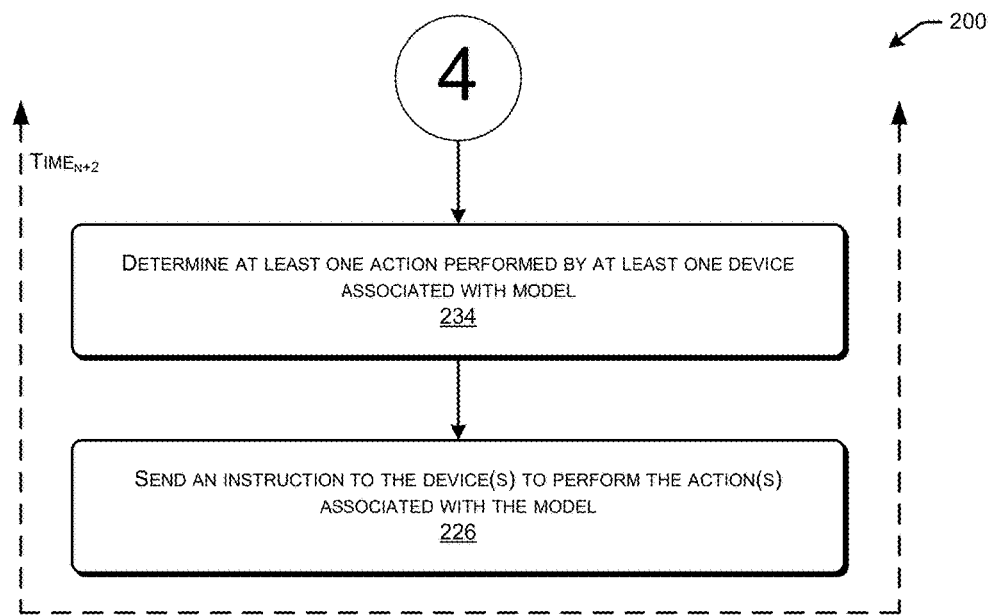

If the sensor data does indeed have a similarity to sensor data associated with a model that is greater than a similarity threshold, then process 200 process to FIG. 5. At 234, the network service determines at least one action that is associated with the model to which the sensor data corresponds. For instance, the model may indicate that a television or speaker system is to be turned on, lights are to be turned off, a thermostat is to be turned up, blinds are to be opened, or the like. At 236, and proximate in time to when the sensor data was received, the network service 106 sends an indication that the received sensor data corresponds to the class specified by the model, the indication for instructing the appropriate device to perform one or more actions associated with the determined model. In some instances, sending the indication includes sending the instruction directly to the device, while in other instances this indication is sent to another device, which generates the instruction for consumption by the device within the environment.

Figure 6:
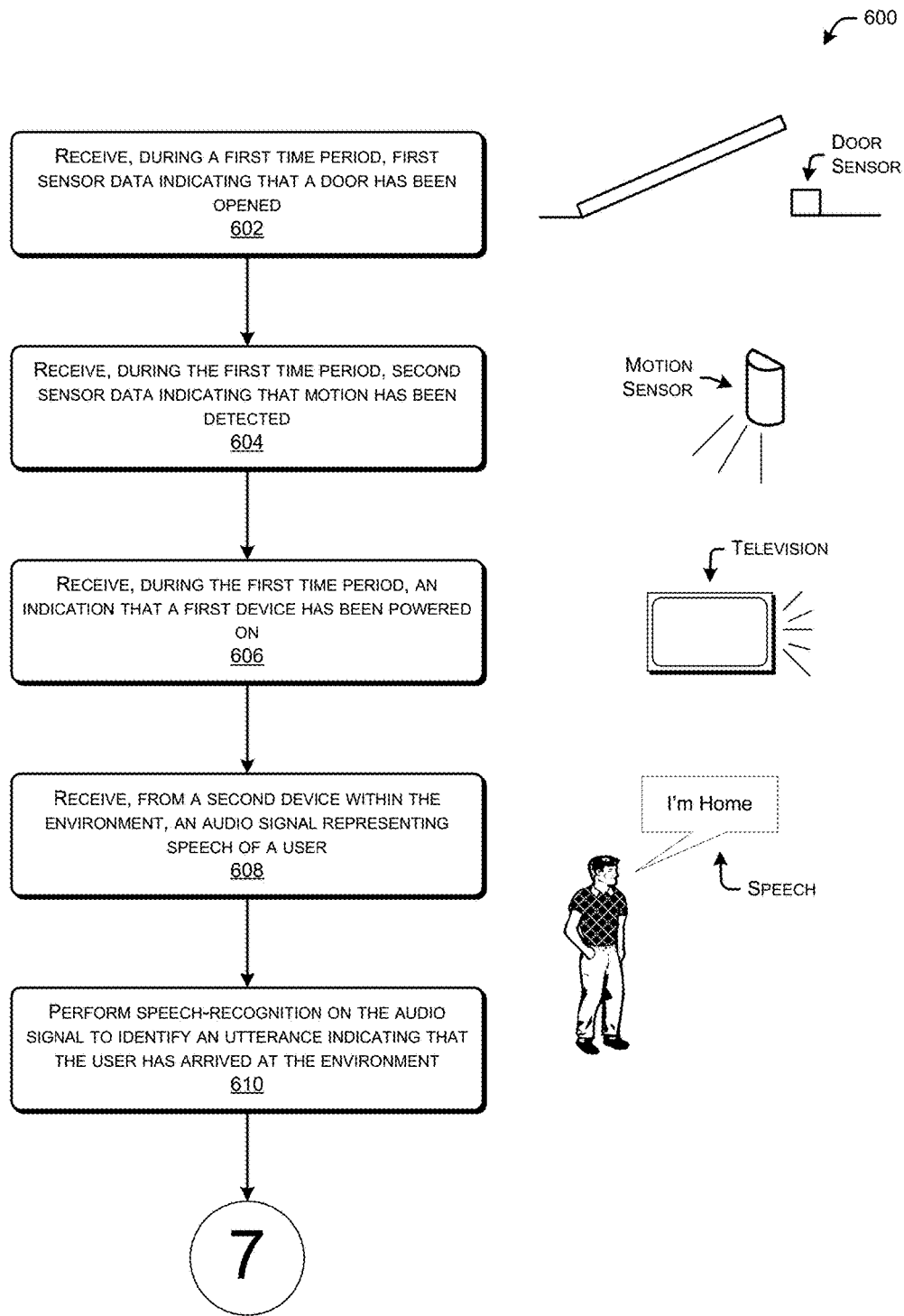
FIGS. 6-8 collectively illustrate a flow diagram of an example process for training a model associated with a user arriving at a user environment. After the model is trained with the aid of a particular voice tag (in this example, "I'm home"), the action associated with the model may be triggered in response to detection of sensor data corresponding to the model.
Figure 7:
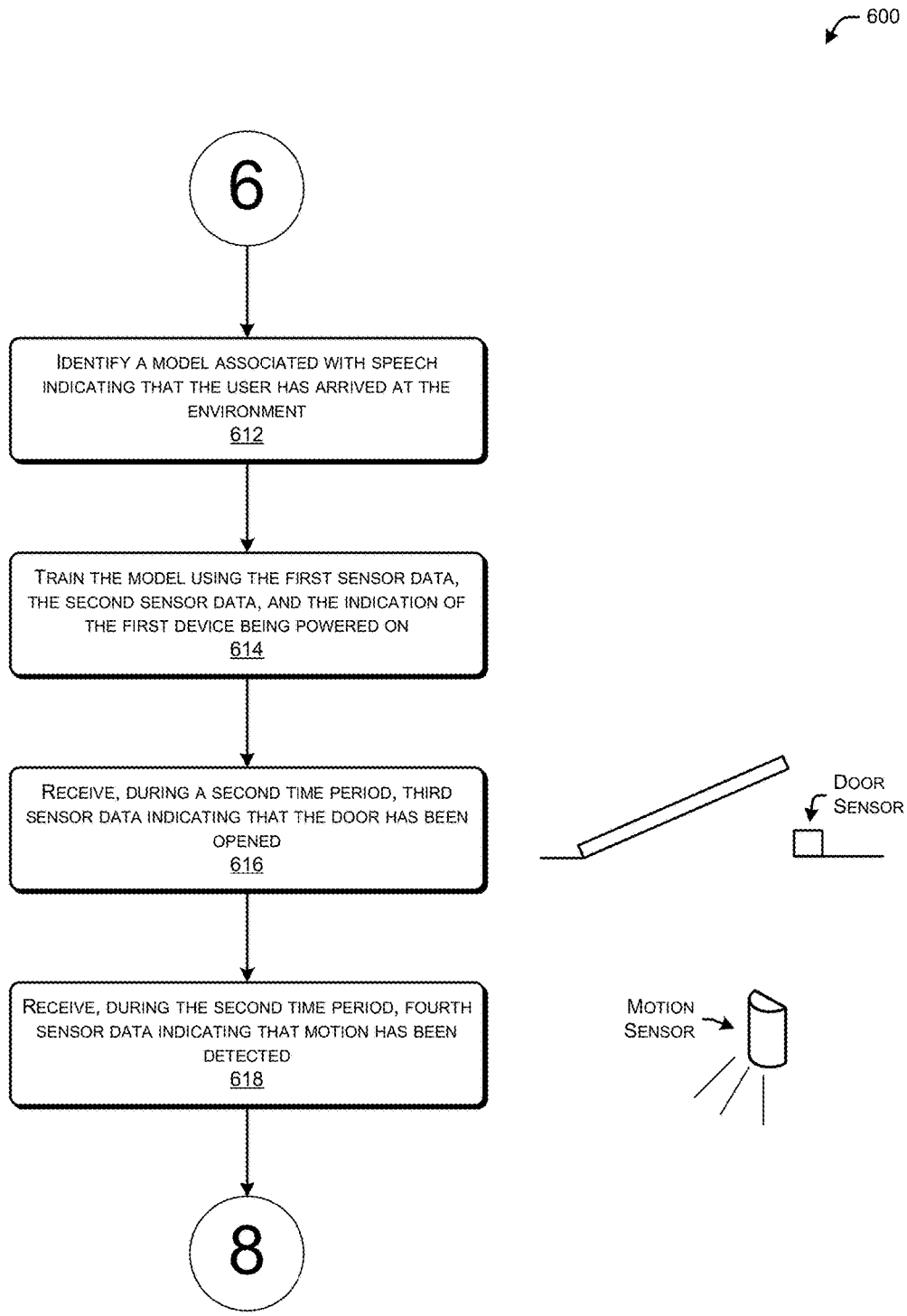
Figure 8:
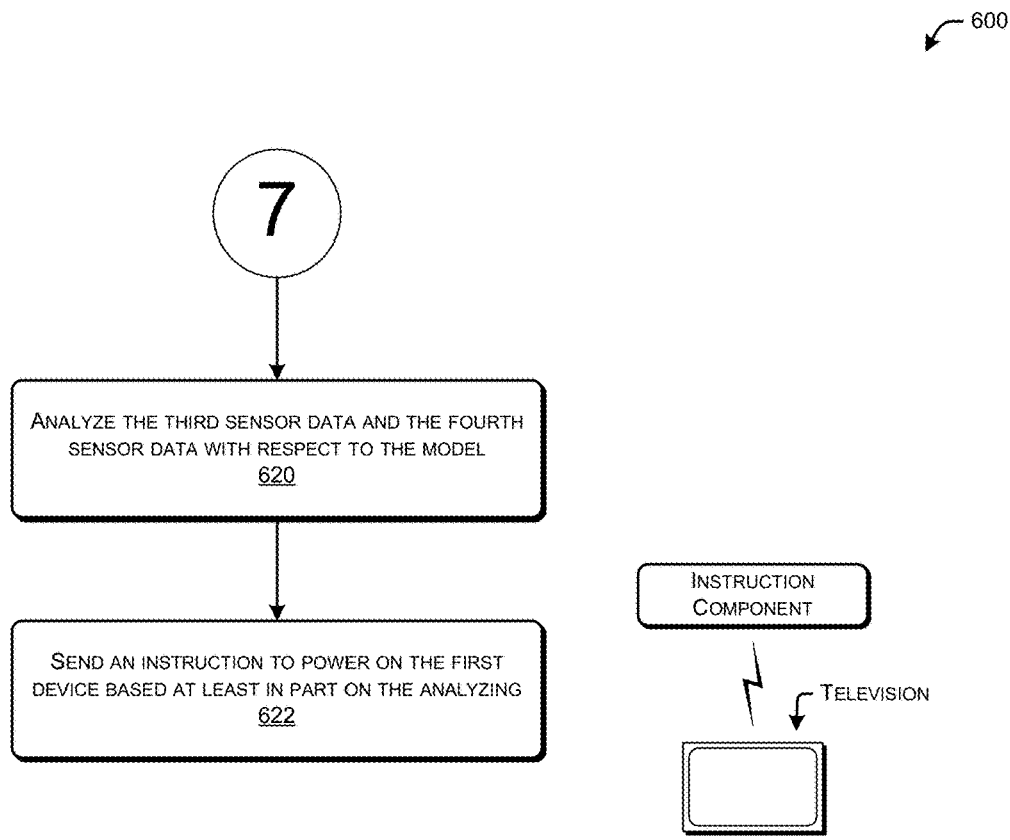

FIGS. 6-8 collectively illustrate a flow diagram of an example process 600 for training a model associated with a user arriving at a user environment. After the model is trained with the aid of a particular voice tag (in this example, "I'm home"), the action associated with the model may be triggered in response to detection of sensor data corresponding to the model. It is to be appreciated that the process 600 illustrates one particular non-limiting example use of the techniques described herein.

At 602, the network service 106 receives, during a first time period, first sensor data from a first sensor within an environment indicating that a door within the environment has been opened. At 604, the network service also receives, during the first time period, second sensor data from a second sensor within the environment indicating that motion has been detected within the environment. In addition, at 606, the network service 106 during the first time period, an indication that a first device within the environment has been powered on. In addition, proximate to these actions, the network service 106 receives, from a second device within the environment, an audio signal representing speech of a user, the speech including an indication that the user has arrived at the environment. At 610, the network service 106 performs speech recognition on the audio signal to identify the speech including the indication that the user has arrived at the environment.

FIG. 7 continues the illustration of the process 600 and includes, at 612, the network service 106 identifying a model previously associated with the indication that the user has arrived at the environment, the model based at least in part on sensor data previously received from the environment. At 614, the network service 106 then trains the model using the received first sensor data, the received second sensor data, and the indication that the first device has been powered on. For instance, the network service 106 may input the received first sensor data, the received second sensor data, and the indication that the first device has been powered on into one or more machine-learning algorithms to train the model.

Thereafter, at 616, the network service 106 receives, during a second time period, third sensor data from the first sensor indicating that the door within the environment has been opened. At 618, the network service also receives, during the second time period, fourth sensor data from the second sensor within the environment indicating that motion has been detected within the environment.

FIG. 8 concludes the illustration of the process and includes, at 620, the network service 106 analyzing the third sensor data and the fourth sensor data with respect to the model. In this example, the network service 106 determines that the third sensor data and the fourth sensor data have a similarity to the model that is greater than a similarity threshold and, therefore, at 622 the network service sends an instruction to power on the first device within the environment at least partly in response to the analyzing.

Figure 9:
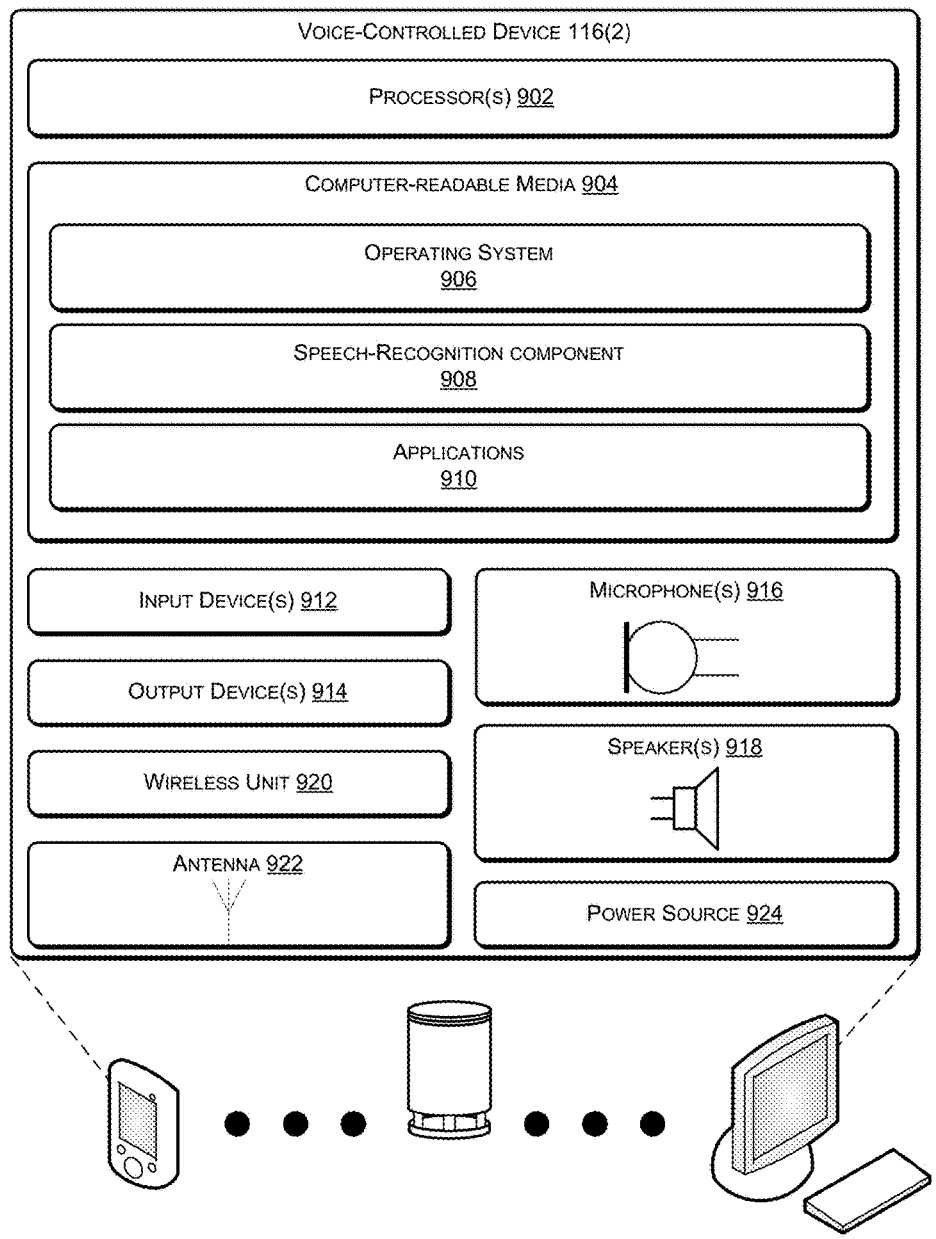
FIG. 9 shows a functional block diagram of selected components implemented at a user device, such as the voice-controlled device of FIG. 1.

FIG. 9 shows selected functional components of a natural language input controlled device, such as the voice-controlled device 116(2) with the user 104 within the environment 102 may interact. The voice-controlled device 116(2) may be implemented as a standalone device 116(2) that is relatively simple in terms of functional capabilities with limited input/output components, memory, and processing capabilities. For instance, the voice-controlled device 116(2) does not have a keyboard, keypad, or other form of mechanical input. Nor does it have a display (other than simple lights, for instance) or touch screen to facilitate visual presentation and user touch input. Instead, the device 116(2) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 116(2) is through voice input and audible output. In some instances, the device 116(2) may simply comprise a microphone, a power source (e.g., a battery), and functionality for sending generated audio signals to another device.

The voice-controlled device 116(2) may also be implemented as a mobile device such as a smart phone or personal digital assistant. The mobile device may include a touch-sensitive display screen and various buttons for providing input as well as additional functionality such as the ability to send and receive telephone calls. Alternative implementations of the voice-controlled device 116(2) may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the voice-controlled device 116(2) includes one or more processors 902 and computer-readable media 904. In some implementations, the processors(s) 902 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 902 may possess its own local memory, which also may store program modules, program data, and/or one or more operating systems.

The computer-readable media 904 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 904 may be implemented as computer-readable storage media ("CRSM"), which may be any available physical media accessible by the processor(s) 902 to execute instructions stored on the memory 904. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 902.

Several modules such as instruction, datastores, and so forth may be stored within the computer-readable media 904 and configured to execute on the processor(s) 902. A few example functional modules are shown as applications stored in the computer-readable media 904 and executed on the processor(s) 902, although the same functionality may alternatively be implemented in hardware, firmware, or as a system on a chip (SOC).

An operating system module 906 may be configured to manage hardware and services within and coupled to the device for the benefit of other modules. The device 116(2) may further including, in some instances, a speech-recognition component 908 that employs any number of conventional speech processing techniques such as use of speech recognition, natural language understanding, and extensive lexicons to interpret voice input. In some instances, the speech-recognition component 908 may simply be programmed to identify the user uttering a predefined word or phrase (i.e., a "wake word"), after which the device 116(2) may begin uploading audio signals to the network service 106 for more robust speech-recognition processing. In other examples, the device 116(2) itself may, for example, identify voice commands from users and may provide indications of these commands to the network service 106.

The voice-controlled device 116(2) may also include a plurality of applications 910 stored in the computer-readable media 904 or otherwise accessible to the device 116(2).

Generally, the voice-controlled device 116(2) has input devices 912 and output devices 914. The input devices 912 may include a keyboard, keypad, mouse, touch screen, joystick, control buttons, etc. In some implementations, one or more microphones 916 may function as input devices 912 to receive audio input, such as user voice input. The output devices 914 may include a display, a light element (e.g., LED), a vibrator to create haptic sensations, or the like. In some implementations, one or more speakers 918 may function as output devices 914 to output audio sounds.

A user 104 may interact with the voice-controlled device 116(2) by speaking to it, and the one or more microphone(s) 916 captures the user's speech. The voice-controlled device 116(2) can communicate back to the user by emitting audible statements through the speaker 918. In this manner, the user 104 can interact with the voice-controlled device 116(2) solely through speech, without use of a keyboard or display.

The voice-controlled device 116(2) may further include a wireless unit 920 coupled to an antenna 922 to facilitate a wireless connection to a network. The wireless unit 920 may implement one or more of various wireless technologies, such as Wi-Fi, Bluetooth, RF, and so on. A USB port may further be provided as part of the device 116(2) to facilitate a wired connection to a network, or a plug-in network device that communicates with other wireless networks. In addition to the USB port, or as an alternative thereto, other forms of wired connections may be employed, such as a broadband connection. Finally, the device 116(2) may include a battery or a connection to a power source 924.

Accordingly, when implemented as the primarily-voice-operated device 116(2), there may be no input devices, such as navigation buttons, keypads, joysticks, keyboards, touch screens, and the like other than the microphone(s) 916. Further, there may be no output such as a display for text or graphical output. The speaker(s) 918 may be the main output device. In one implementation, the voice-controlled device 116(2) may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 116(2) may be implemented as an aesthetically appealing device with smooth and rounded surfaces, with one or more apertures for passage of sound waves. The device 116(2) may merely have a power cord and optionally a wired interface (e.g., broadband, USB, etc.). As a result, the device 116(2) may be generally produced at a low cost. Once plugged in, the device may automatically self-configure, or with slight aid of the user, and be ready to use. In other implementations, other I/O components may be added to this basic model, such as specialty buttons, a keypad, display, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors; and one or more computer-readable media storing computer-executable instructions that, when executed on the one or more processors, cause the one or more processors to perform acts comprising:

receiving, during a first time period, first sensor data from a first sensor within an environment indicating that a door within the environment has been opened;

receiving, during the first time period, second sensor data from a second sensor within the environment indicating that motion has been detected within the environment;

receiving, during the first time period, an indication that a first device within the environment has been powered on;

receiving, from a second device within the environment, an audio signal representing speech of a user, the speech including an indication that the user has arrived at the environment;

performing speech recognition on the audio signal to identify the speech;

identifying a model previously associated with the indication that the user has arrived at the environment, the model based at least in part on sensor data previously received from the environment;

inputting the first sensor data, the second sensor data, and the indication that the first device has been powered on into one or more machine-learning algorithms to train the model;

receiving, during a second time period, third sensor data from the first sensor indicating that the door within the environment has been opened;

receiving, during the second time period, fourth sensor data from the second sensor within the environment indicating that motion has been detected within the environment;

determining that the third sensor data and the fourth sensor data correspond to a class specified by the model; and sending an instruction to power on the first device within the environment at least partly in response to determining that the third sensor data and the fourth sensor data correspond to the class.

2. A system as recited in claim 1, the acts further comprising:

receiving, during the first time period, a first signal from a mobile device that is associated with a profile of the user, the first signal identifying the mobile device; and receiving, during the second time period, a second signal from the mobile device, the second signal identifying the mobile device, and wherein sending the instruction to power on the first device is further in response to receiving the second signal identifying the mobile device.

3. A system as recited in claim 1, the acts further comprising, prior to sending the instruction, outputting, on one or more devices in the environment, a query regarding whether to power on the first device.

4. A system as recited in claim 1, the acts further comprising:

receiving, prior to the second time, a voice command requesting: (i) to power on a third device, and (ii) to associate an act of powering on the third device with the model;

storing an association between the act of powering on the third device and the model; and sending an instruction to power on the third device at least partly in response to determining that the third sensor data and the fourth sensor data correspond to the class.

5. A method comprising:

receiving information indicative of events occurring, in a first sequential order, in an environment during a first time period, the information including:

a first collection of sensor data received from one or more sensors in the environment, the first collection of sensor data captured during the first time period, and an indication, received from a first device in the environment, of at least one action performed by the first device during the first time period;

receiving an audio signal generated by a second device disposed within the environment and separate from the first device, the audio signal representing an utterance made by a user during the first time period;

identifying a model associated with the utterance;

inputting at least the first collection of sensor data and the indication of the at least one action into one or more machine-learning algorithms to train the model based at least partly on the first sequential order, the model determining a correlation between at least a portion of the first collection of sensor data and the at least one action performed by the first device;

receiving, from the one or more sensors in the environment, a second collection of sensor data captured during a second time period later than the first time period;

determining, based at least partly on the first sequential order, that at least a portion of the second collection of sensor data corresponds to the model; and based at least in part on determining that the at least the portion of the second collection of sensor data corresponds to the model, sending an instruction to the first device to cause the first device to perform the at least one action based at least in part on the correlation.

6. A method as recited in claim 5, wherein the indication comprises a first indication, the at least one action comprises a first at least one action, the utterance comprises a first utterance, and the audio signal comprises a first audio signal, and wherein the method further comprises:

receiving, from the one or more sensors in the environment, a third collection of sensor data associated with a third time;

receiving a second indication of at least a second action performed by a third device separate from the first device;

receiving a second audio signal generated by the second device, the second audio signal representing a second utterance;

identifying the model based at least in part on the second utterance; and inputting at least the third collection of sensor data and the second indication of the second action into the one or more machine-learning algorithms to train the model.

7. A method as recited in claim 5, wherein the model is associated with a profile of the user that uttered the utterance, and wherein the method further comprises:

determining that a user associated with the second collection of sensor data is the user that uttered the utterance, and wherein sending the instruction to the first device is further based at least in part on determining that the user associated with the second collection of sensor data is the user that uttered the utterance.

8. A method as recited in claim 5, wherein the model is a first model associated with a profile of the user that uttered the utterance, and wherein the method further comprises:
- identifying a different profile of another user, the different profile being associated with a second model that is associated with the utterance;
- determining a second action associated with the second model; and
- outputting a suggestion that the user associate the second action with the first model.

9. A method as recited in claim 5,
- wherein determining, based at least partly on the first sequential order, that the at least the portion of the second collection of sensor data corresponds to the model includes comparing the first sequential order with a second sequential order of events corresponding to the second collection of sensor data.

10. A method as recited in claim 9,
- wherein determining, based at least partly on the first sequential order, that the at least the portion of the second collection of sensor data corresponds to the model further includes comparing a first elapsed time of the first time period with a second elapsed time of the second time period.

11. A method as recited in claim 5, wherein:
- the one or more sensors are separate from the first device and the second device,
- the at least one action is performed in the environment and comprises activation of the first device, and
- the first collection of sensor data is indicative of the at least one action at least one of a movement or a sound.

12. A method as recited in claim 5, further comprising:
- receiving, from the one or more sensors in the environment, a third collection of sensor data captured by the one or more sensors at a third time different from the first time period and the second time period;
- receiving an indication of at least one additional action performed, at the third time, by the first device in the environment; and
- creating the model based at least in part on the third collection of sensor data and the at least one additional action.

13. A method as recited in claim 5, further comprising:
- determining, based at least in part on determining that the at least the portion of the second collection of sensor data corresponds to the model, that the model associates the at least the portion of the second collection of sensor data with the at least one action,
- wherein sending the instruction to the device to cause the device to perform the at least one action is based at least in part on determining that the model associates the at least the portion of the second collection of sensor data with the at least one action.

14. A system comprising:
- one or more processors; and
- one or more computer-readable media storing computer-executable instructions that, when executed on the one or more processors, cause the one or more processors to perform acts comprising:
    - receiving information indicative of events occurring, in a first sequential order, in an environment during a first time period, the information including:
        - a first collection of sensor data received from one or more sensors in the environment, the first collection of sensor data captured during the first time period, and
        - an indication, received from a first device in the environment, of at least one action performed by the first device during the first time period;
    - receiving an audio signal generated by a second device disposed within the environment and separate from the first device, the audio signal representing an utterance made by a user during the first time period;
    - identifying a model associated with the utterance;
    - inputting at least the first collection of sensor data and the indication of the at least one action into one or more machine-learning algorithms to train the model based at least partly on the first sequential order, the model determining a correlation between at least a portion of the first collection of sensor data and the at least one action performed by the first device;
    - receiving, from the one or more sensors in the environment, a second collection of sensor data captured during a second time period later than the first time period;
    - determining, based at least partly on the first sequential order, that at least a portion of the second collection of sensor data corresponds to the model; and
    - based at least in part on determining that the at least the portion of the second collection of sensor data corresponds to the model, sending an instruction to the first device to cause the first device to perform the at least one action based at least in part on the correlation.

15. A system as recited in claim 14, wherein the indication comprises a first indication, the at least one action comprises a first at least one action, the utterance comprises a first utterance, and the audio signal comprises a first audio signal, and the acts further comprising:
- receiving, from the one or more sensors in the environment, a third collection of sensor data associated with a third time;
- receiving a second indication of at least a second action performed by a third device separate from the first device;
- receiving a second audio signal generated by the second device, the second audio signal representing a second utterance;
- identifying the model based at least in part on the second utterance; and
- inputting at least the third collection of sensor data and the second indication of the second action into the one or more machine-learning algorithms to train the model.

16. A system as recited in claim 14, wherein the model is associated with a profile of the user that uttered the utterance, and the acts further comprising:
- determining that a user associated with the second collection of sensor data is the user that uttered the utterance,
- and wherein sending the instruction to the first device is further based at least in part on determining that the user associated with the second collection of sensor data is the user that uttered the utterance.

17. A system as recited in claim 14, wherein the model is a first model associated with a profile of the user that uttered the utterance, and the acts further comprising:
- identifying a different profile of another user, the different profile being associated with a second model that is associated with the utterance;
- determining a second action associated with the second model; and
- outputting a suggestion that the user associate the second action with the model.

18. A system as recited in claim 14, the acts further comprising:
- outputting a request to confirm that the at least one action performed by the first device is to be associated with the model;
- receiving an indication that the at least one action performed by the first device is to be associated with the model; and
- storing an indication that the at least one action is to be performed at least partly in response to identifying sensor data that corresponds to the model.

19. A system as recited in claim 14, wherein determining, based at least partly on the first sequential order, that the at least the portion of the second collection of sensor data corresponds to the model includes determining that a level of similarity between the second collection of sensor data and the first collection of sensor data is greater than or equal to a threshold similarity level.

20. A system as recited in claim 14, the acts further comprising:
- identifying the user based at least in part on the first collection of sensor data; and
- determining that the user is associated with the model,
- and wherein inputting at least the first collection of sensor data and the indication of the at least one action into the one or more machine-learning algorithms to train the model is based at least in part on determining that the user is associated with the model.

* * * * *